US008436713B2

(12) United States Patent
Hormann

(10) Patent No.: US 8,436,713 B2
(45) Date of Patent: May 7, 2013

(54) DOOR DRIVE

(75) Inventor: Michael Hormann, Halle/Westf (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 417 days.

(21) Appl. No.: 12/454,196

(22) Filed: May 14, 2009

(65) Prior Publication Data

US 2009/0284346 A1 Nov. 19, 2009

(30) Foreign Application Priority Data

May 15, 2008 (DE) ..................... 20 2008 006 633 U
Jul. 17, 2008 (DE) ..................... 20 2008 009 618 U

(51) Int. Cl.

| | |
|---|---|
| ***B60R 25/00*** | (2006.01) |
| ***H02P 1/00*** | (2006.01) |
| ***H02P 3/00*** | (2006.01) |
| ***H02P 5/00*** | (2006.01) |
| ***H02P 7/00*** | (2006.01) |
| ***G05B 5/00*** | (2006.01) |
| ***H02H 7/08*** | (2006.01) |

(52) U.S. Cl.
USPC .......... 340/5.71; 318/266; 318/268; 318/270; 318/272; 318/274; 318/275; 318/277; 318/466; 318/468; 341/176

(58) Field of Classification Search .................... 340/5.7
See application file for complete search history.

(56) References Cited

U.S. PATENT DOCUMENTS

| | | | | |
|---|---|---|---|---|
| 4,638,433 | A * | 1/1987 | Schindler | 700/90 |
| 6,903,650 | B2 * | 6/2005 | Murray | 340/5.23 |
| 7,180,260 | B2 * | 2/2007 | Murphy et al. | 318/466 |
| 7,468,676 | B2 * | 12/2008 | Styers et al. | 340/686.1 |

* cited by examiner

*Primary Examiner* — Brent Swarthout
*Assistant Examiner* — John Mortell
(74) *Attorney, Agent, or Firm* — Dilworth & Barrese, LLP.

(57) ABSTRACT

The present invention relates to a door drive, in particular a garage door drive, with a door control and with a programming unit for programming the door control during operation and/or maintenance of the door drive. In accordance with the invention, the programming unit is configured as an external device, wherein for operation and/or maintenance of the door drive a data transmission connection can be established between the programming unit and the door control.

19 Claims, 3 Drawing Sheets

DOOR DRIVE

BACKGROUND OF THE INVENTION

The present invention relates to a door drive, in particular a garage door drive, with a door control and with a programming unit for programming the door control during operation and/or maintenance of the door drive.

In known door drives, such programming units are integrated in the door control and serve to program the functions of the door control during operation and/or maintenance of the door drive.

Due to the input and output elements of the programming unit, however, the same is of relatively large size, which in turn increases the size of the door drive, since a relatively large board is required for the input and output elements. In addition, the programming unit with its many functions adds to the costs of the door drive.

Furthermore, in programmable door controls, many of the functions to be programmed should only be performed by trained professionals, since here safety-relevant aspects of the door control are changed. In known door drives with integrated programming unit, which hence is accessible for everyone, there always is a risk that these safety-relevant settings nevertheless are changed by laymen, so that the safe operation of the door drive is jeopardized.

SUMMARY OF THE INVENTION

Therefore, it is the object of the present invention to provide a door drive which is of smaller size and can be manufactured in a less expensive way. In addition, it is the object of the present invention to provide a door drive in which the programming safety is increased.

In accordance with the invention, this object is solved by a door drive according to the description herein. Such door drive, in particular garage door drive, includes a door control and a programming unit for programming the door control during operation and/or maintenance of the door drive. In accordance with the invention, it is provided that the programming unit is configured as an external device, wherein for operation and/or maintenance of the door drive a data transmission connection can be established between the programming unit and the door control. By incorporating the programming unit in an external device outside the door control in accordance with the invention, the door control itself can be of much smaller size. In this way, packaging space and costs are saved. For operation and/or maintenance of the door drive, the programming unit of the invention then must merely be connected with the door control, in order to perform programming of the door control. The data transmission connection can be effected either via a cable or wireless. A further advantage consists in that only the service technician requires a corresponding external device, which he can connect with the door drive for the case of operation or maintenance. In this way, it can furthermore be ensured that safety-relevant functions only can be adjusted by the service technician, so that the safety of the door drive is also increased.

Advantageously, the programming unit of the invention includes input and output elements, in particular input keys and an optical display. As optical display, e.g. LEDs, LCDs, TFTs or OLEDs can be used. The input elements are used for programming the door drive, whereas the status of the programming unit and of the door drive can be displayed on the output elements.

Advantageously, the programming unit includes functions for programming the door run. The programming unit hence can be used during operation and/or maintenance of the door drive, in order to adjust parameters of the door run in the door control.

In particular, the programming unit can comprise a function for adjusting the end positions of the door run and/or for automatically adjusting the overload shutdown. In this way, the upper and lower end positions of the door can be adjusted via the programming unit during operation and/or maintenance of the door drive and/or a teaching run can be initiated for automatically adjusting the overload shutdown.

Furthermore, the programming unit can comprise a function for manually adjusting the speed and/or the overload shutdown, in particular the force limitation. Such possibilities for the manual adjustment of safety-relevant operating parameters advantageously only are possible via the external programming unit. In this way, it can be prevented that untrained persons wrongly adjust these parameters of the door control and thus jeopardize the safety of the door drive.

Furthermore advantageously, the programming unit includes a function for programming additional components, in particular for programming a light barrier. This also is a safety-relevant component, so that this function advantageously only is possible via the external programming unit.

Furthermore advantageously, the programming unit includes a function for programming handheld transmitters. In this way, it is possible to perform the coding of handheld transmitters and door control via the programming unit. There must be determined a code by means of which the door control recognizes the handheld transmitter, so that the door drive can be actuated via the handheld transmitter.

Furthermore advantageously, the door drive of the invention includes a further operating unit for programming the basic settings of the door control, which is integrated in the door control. Advantageously, such operating unit comprises a function for adjusting the end positions of the door run and/or for programming handheld transmitters. These functions can also be performed by laymen, so that incorporation into the external control is not necessary at least for safety reasons. The buyer of the door drive hence is enabled to himself adjust certain basic functions of the door control. Advantageously, the programming unit configured as an external device includes further functions, in particular safety-relevant functions. The same then can only be performed by the service technician, so that a maloperation by laymen is excluded. In particular, only the programming unit advantageously includes a function for the manual adjustment of the speed and/or the overload shutdown, in particular the force limitation, and/or a function for programming additional components, in particular a light barrier.

In accordance with the invention, the data transmission connection between the programming unit and the door control can be effected via a cable connection. In this way, it is ensured that access to the door control cannot be effected inadvertently.

Alternatively, however, the data transmission connection is effected wireless. In this way, the operating comfort is increased for the service technician.

The wireless data transmission can be effected e.g. via a radio connection or via an optical connection. Advantageously, the data transmission connection between the programming unit and the door control is effected via an optical interface, in particular with a clocked light-emitting diode. In this way, a particularly simple and yet extremely safe data transmission connection is obtained. In particular, safety is increased as compared to commonly used radio connections, since access to the programming functions of the door control only is possible in the direct vicinity of the door control.

If a radio connection is used, however, a means integrated in the door control advantageously is provided, which prevents that the door control can inadvertently be programmed from outside. For instance, on the radio connection unit of the door control a radio antenna is provided, which can releasably be connected with the radio connection unit via a plug-in connection.

Furthermore advantageously, the door drive of the invention includes a drive unit which is mounted on the ceiling above the door and moves the door via a tappet guided in a rail. In particular, this is a garage door drive. Especially in such door drives, the programming unit configured as an external device in accordance with the invention is particularly advantageous, as in such door drives the packaging space and the costs are of particular importance.

In accordance with the invention, the door control of this door drive advantageously is integrated in the drive unit. Due to the external programming unit in accordance with the invention, the door control can be kept particularly small, so that the drive unit also can have a compact construction.

The present invention furthermore comprises a programming unit for a door drive as described above. Quite obviously, such programming unit offers the same advantages as set forth above with respect to the door drive. In particular, this involves the advantage that only the service technician requires a corresponding programming unit, which for operation and/or maintenance of the door drive he will then connect with the door control for data transmission.

BRIEF DESCRIPTION OF THE DRAWINGS

The present invention will now be illustrated in detail with reference to drawings and embodiments. In the drawings.

DESCRIPTION OF THE PREFERRED EMBODIMENTS

Figure 1:
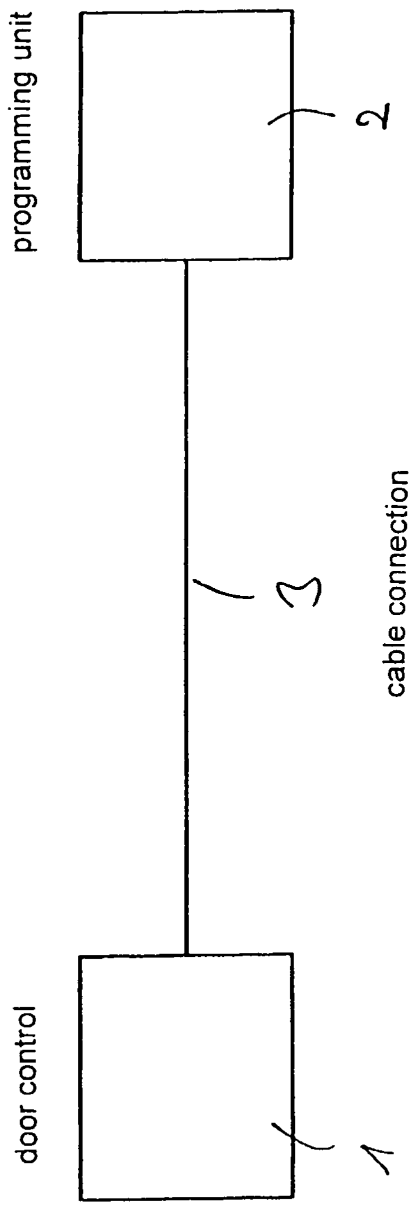
FIG. 1: shows a first embodiment of the door drive in accordance with the invention.

FIG. 1 shows a first embodiment, in which the data transmission connection 3 between the door control 1 and the programming unit 2 is effected via a cable connection. Thus, the service technician can releasably connect the programming unit with the door control 1 via the cable connection, e.g. by means of a connector, in order to program the same. Upon completion of the programming work, the programming unit 2 again is separated from the door control 1 and is available to the service technician for programming work on other door controls. By means of such releasable connection of the programming unit with the door control by means of a cable connection it is ensured that access to the door control cannot be effected inadvertently and from outside.

Figure 2:
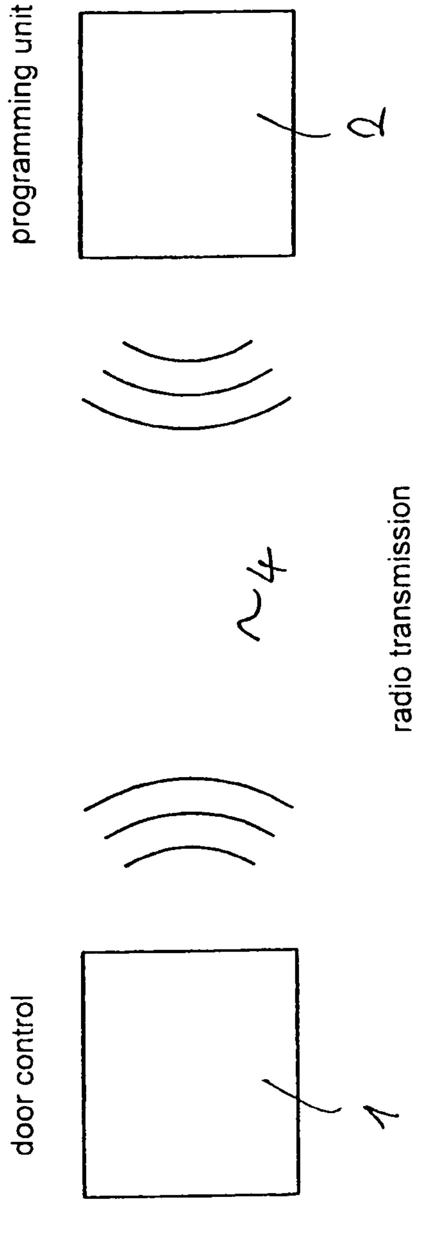
FIG. 2: shows a second embodiment of the door drive in accordance with the invention.

FIG. 2 shows a second embodiment of the door drive in accordance with the invention, in which a radio transmission 4 is provided as data transmission connection. In this way, the operating comfort is increased for the service technician. As an alternative to radio transmission, an optical interface can also be provided, which offers an increased safety with respect to inadvertent external accesses to the door control.

Figure 3:
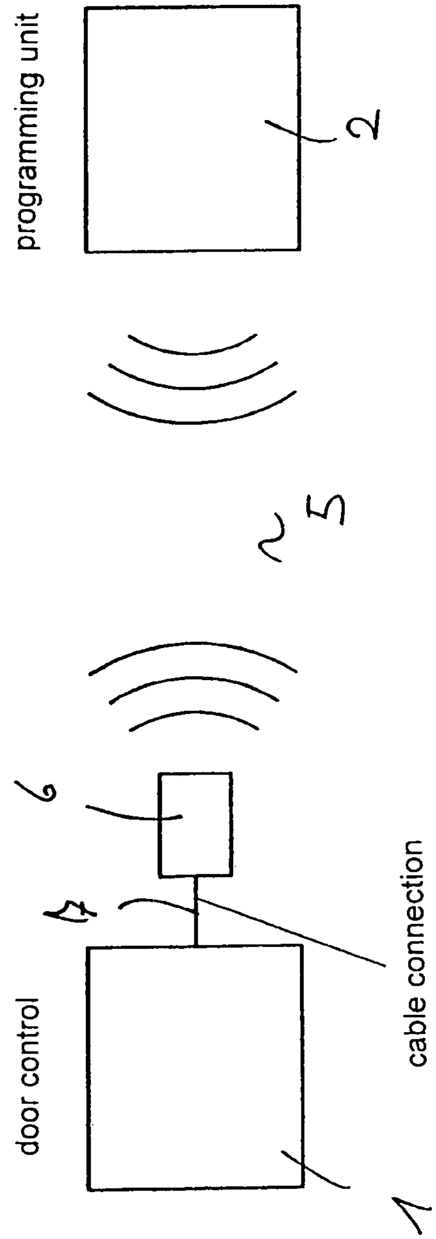
FIG. 3: shows a third embodiment of the door drive in accordance with the invention.

In the third embodiment shown in FIG. 3, however, a radio transmission 5 is provided as a data transmission connection, in which the antenna 6 of the radio connection means of the door control 1 can releasably be connected with the door control via a cable connection 7, e.g. via a plug-in connection. In this way, an inadvertent external access to the door control also can effectively be prevented.

The invention claimed is:

1. A door drive, in particular garage door drive, comprising a door control and programming unit for programming the door control during operation or maintenance of the door drive, wherein the programming unit comprises functions for programming the door run and is configured as an external device remote from both the door control and drive and releasably connected to the door control merely during programming, and the door drive comprises two operating modes (i) and (ii), (i) a first operating mode wherein a user interface between the programming unit and door control is unconnected and the door control cannot be programmed, and (ii) a second operating mode wherein the user interface is connected between the programming unit and door control and the door control can be programmed, such that for programming operation or maintenance of the door drive, a data transmission connection is only established between the programming unit and door control when the door control is programmed and only one having access to the external programming unit is able to program the door drive, wherein safety-relevant operating parameters can only be programmed via the releasably connected programming unit.

2. The door drive according to claim 1, wherein the programming unit includes input and output elements, in particular input keys and an optical display.

3. The door drive according to claim 1, wherein the programming unit comprises a function for adjusting the end positions of the door run or automatic adjustment of the overload shutdown.

4. The door drive according to claim 1, wherein only the programming unit comprises a function for the manual adjustment of the speed or the overload shutdown, in particular the force limitation.

5. The door drive according to claim 1, wherein only the programming unit comprises a function for programming additional components, in particular a light barrier.

6. The door drive according to claim 1, wherein the programming unit includes a function for programming handheld transmitters.

7. The door drive according to according to claim 4, wherein a further operating unit for programming the basic settings of the door control is integrated in the door control, in particular an operating unit which comprises a function for adjusting the end positions of the door run or automatically adjusting the overload shutdown and/or for programming handheld transmitters.

8. The door drive according to claim 1, wherein the data transmission connection between the programming unit and the door control is effected via a cable connection.

9. The door drive according to claim 1, wherein the data transmission connection between the programming unit and the door control is effected wireless.

10. The door drive according to claim 9, wherein the data transmission connection between the programming unit and the door control is effected via a radio connection or an optical interface, in particular with a clocked light-emitting diode.

11. The door drive according to claim 1, comprising a drive unit which is mounted on the ceiling above the door and moves the door via a tappet guided in a rail.

12. The door drive according to claim 11, wherein the door control is integrated in the drive unit.

13. A programming unit for a door drive according to claim 1.

14. The door drive according to according to claim 5, wherein a further operating unit for programming the basic settings of the door control is integrated in the door control, in particular an operating unit which comprises a function for adjusting the end positions of the door run or automatically adjusting the overload shutdown and/or for programming handheld transmitters.

15. The door drive according to claim 2, wherein the programming unit comprises functions for programming the door run.

16. The door drive according to claim 15, wherein the programming unit comprises a function for adjusting the end positions of the door run or automatic adjustment of the overload shutdown.

17. The door drive according to claim 16, wherein the programming unit comprises a function for the manual adjustment of the speed or overload shutdown, in particular the force limitation.

18. The door drive according to claim 3, wherein the programming unit comprises a function for the manual adjustment of the speed or overload shutdown, in particular the force limitation.

19. The door drive according to claim 17, wherein the programming unit comprises a function for programming additional components, in particular a light barrier.

* * * * *